United States Patent [19]

Swartz

[11] Patent Number: 5,117,098
[45] Date of Patent: * May 26, 1992

[54] MULTI-POSITION TRIGGER FOR CONTROL OVER AIMING AND SYMBOL READING IN A PORTABLE LASER DIODE SCANNING HEAD

[75] Inventor: Jerome Swartz, Old Field, N.Y.

[73] Assignee: Symbol Technologies, Inc., Bohemia, N.Y.

[*] Notice: The portion of the term of this patent subsequent to Jul. 26, 2005 has been disclaimed.

[21] Appl. No.: 544,628

[22] Filed: Jun. 27, 1990

Related U.S. Application Data

[63] Continuation-in-part of Ser. No. 414,450, Sep. 29, 1989, abandoned.

[51] Int. Cl.$^5$ .................................................. G06K 7/10
[52] U.S. Cl. ..................................... 235/472; 235/467
[58] Field of Search ................................. 235/467, 472

[56] References Cited

U.S. PATENT DOCUMENTS

| | | | |
|---|---|---|---|
| 4,251,798 | 3/1981 | Swartz et al. | 340/146.3 SY |
| 4,333,006 | 6/1982 | Gorin et al. | 235/467 X |
| 4,360,798 | 11/1982 | Swartz et al. | 340/146.3 AG |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,496,831 | 1/1985 | Swartz et al. | 235/472 |
| 4,575,625 | 3/1986 | Knowles | 235/472 X |
| 4,593,186 | 6/1986 | Swartz et al. | 235/472 |
| 4,673,805 | 6/1987 | Shepard et al. | 235/472 |
| 4,736,095 | 4/1988 | Shepard et al. | 235/472 |
| 4,758,717 | 7/1988 | Shepard et al. | 235/472 |
| 4,760,248 | 7/1988 | Swartz et al. | 235/472 |
| 4,805,742 | 2/1989 | Swartz et al. | 235/472 |
| 4,816,660 | 3/1989 | Swartz et al. | 235/472 |
| 4,816,661 | 3/1989 | Krichever et al. | 235/472 |
| 4,825,057 | 4/1989 | Swartz et al. | 235/472 |
| 4,835,374 | 5/1989 | Swartz et al. | 235/472 |
| 4,897,532 | 1/1990 | Swartz et al. | 235/467 |
| 4,933,538 | 6/1990 | Heiman et al. | 235/463 X |

*Primary Examiner*—David Trafton

[57] ABSTRACT

A multi-position trigger switch on-board hand-held laser scanning heads controls aiming and reading of a symbol in separate operational states, all without using discrete aiming light subsystems. A head is aimable at the symbol during a first operational state wherein a static or dynamic aiming is illuminated on the symbol. During a second operational state, a dynamic reading zone extends across the symbol to read the same. The same laser beam is employed to illuminate both zones.

17 Claims, 3 Drawing Sheets

MULTI-POSITION TRIGGER FOR CONTROL OVER AIMING AND SYMBOL READING IN A PORTABLE LASER DIODE SCANNING HEAD

CROSS-REFERENCE TO RELATED APPLICATION

This is a continuation-in-part of application Ser. No. 414,450 filed Sep. 29, 1989, now abandoned.

BACKGROUND OF THE INVENTION

1. Field of the Invention

The present invention generally relates to scanning systems for reading indicia having parts of different light reflectivity, such as bar code symbols and, more particularly, to a multi-state, portable scanning system supportable by a user and aimable at each symbol to be read, one operational state being used for aiming or reading, another operational state being used for reading respective symbols.

2. Description of Related Art

Various optical readers and optical scanning systems have been developed heretofore to optically read indicia such as bar code symbols applied to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. The readers and scanning systems electro-optically decoded the coded pattern to a multiple alpha-numerical digit representation descriptive of the object. Scanning systems of this general type have been disclosed, for example, in U.S. Pat. Nos. 4,251,798; 4,360,798; 4,369,361; 4,387,297; 4,409,470; 4,460,120 and 4,835,374, all of which have been assigned to the same assignee as the instant application.

As disclosed in some of the above patents, a particularly advantageous embodiment of such a scanning system resided inter alia, in emitting a laser light beam from a hand-held, portable laser scanning head which was supported by a user; aiming the head and, more particularly, the laser light beam, at a symbol to be read; repetitively scanning the laser beam in a series of scans across the symbol; detecting the scanned laser light which is reflected off the symbol; and decoding the detected reflected light. Inasmuch as the laser light beam was usually, but not always, generated by a helium-neon gas laser which emitted red laser light at a wavelength of about 6328 Angstrom units, the red laser light was visible to the user and, thus, the user, without difficulty, could properly aim the head and position and maintain the emitted red laser light on and across the symbol during the scanning However, in the event that the laser light beam was generated by a semiconductor laser diode, as, by way of example, see U.S. Pat Nos. 4,387,297; 4,409,470 and 4,460,120, then the aiming of the head relative to the symbol was rendered more difficult when the laser diode emitted laser light which was not readily visible to the user. For some laser diodes, the laser light was emitted at a wavelength of about 7800 Angstrom units, which was very close to infrared light and was on the borderline of being visible. Even with the advent of laser diodes whose emitted light was in the visible wavelength range, ambient light tended to mask out the laser diode light. Furthermore, if the laser diode light was moving, for example, by being swept across the symbol, and especially if the laser diode light was being swept at fast rates of speed on the order of a plurality of times per second, for example, at a rate of 40 scans per second, then the laser diode light was not readily visible to the user, even in a darkened room. Hence, due to one or more of such factors as the wavelength of the laser light, the intensity of the laser light, the intensity of the ambient light in the environment in which the laser light was operating, the scanning rate, as well as other factors, the laser diode light was rendered "non-readily visible".

This non-readily visible laser diode light did not enable the user, however, to readily aim the laser diode light at the symbol, at least not without some difficulty and practiced effort because, simply put, the user could not see the laser diode light. The user, therefore, was required to hunt around by trial and error, hope that the scanning laser diode light was eventually properly positioned on and across the symbol, and wait until the scanning system advised him, typically by the lighting of an indicator lamp or by the sounding of an auditory beeper, that the symbol had indeed been successfully decoded and read. This hunting technique was a less-than-efficient and time-consuming procedure for reading symbols, particularly in those applications where a multitude of symbols had to be read every hour and every day.

In an attempt to enable the user to readily aim the laser diode light at the symbol, U.S. Pat. No. 4,835,374 proposed an aiming light arrangement to assist the user in visually locating and aiming the head at each symbol when non-readily-visible laser light was employed. The aiming light arrangement utilized a visible light source, e.g. one or more light emitting diodes, which was separate and distinct from the laser light source. A manually-operated trigger was employed to actuate the aiming light arrangement in a first operational state of the trigger for visibly illuminating a region on the symbol. This visible region was used for aiming purposes. Thereupon, in a second operational state of the trigger, the laser light source was actuated, thereby initiating the reading of the symbol.

Although the use of a discrete aiming light arrangement did assist the user in reliably aiming the head at the symbol, it was disadvantageous, primarily because it made the head bigger, heavier and less energy-efficient. The discrete light emitting diodes added some weight to the head, occupied space within the head, required separate electrical power and control circuitry, and consumed electrical power. It is desirable to make the head of such systems as lightweight, miniature, and efficient as possible.

SUMMARY OF THE INVENTION

1. Objects of the Invention

It is a general object of this invention to overcome the above-described drawbacks of the prior art laser scanning systems.

It is another object of this invention to eliminate discrete aiming light arrangements.

It is a further object of this invention to enable a user to readily aim a laser beam emitted by a semiconductor laser diode on and across a symbol prior to and during a scan of the symbol.

Yet another object of this invention is to eliminate the trial-and-error hunting techniques, particularly at long working distances, in aiming a semiconductor laser diode beam at a symbol.

Still another object of this invention is to increase the efficiency and reduce the time involved in optically reading a symbol with a semiconductor laser diode beam.

A still further object of this invention is to accurately locate a symbol with a semiconductor laser diode-based scanner prior to a scan, and to accurately track the symbol with the semiconductor laser diode-based scanner during the scan.

Another object of this invention is to use the same light source for both aiming and reading.

A further object of this invention is to provide a multi-position, manually-depressible trigger for controlling aiming and reading.

Still another object of this invention is to provide a multi-position trigger for controlling the reading of symbols located at different distances from the head.

Yet another object of this invention is to provide a very lightweight, streamlined, compact, handheld, fully-portable, easy-to-manipulate, non-arm-and-wrist-fatiguing laser diode scanning head, and/or system supportable entirely by a user during the optical reading of symbols, especially black and white symbols used in industrial applications, but also bar code symbols of the type known as the Universal Product Code (UPC).

2. Features of the Invention

In keeping with these objects, and others which will become apparent hereinafter, one feature of this invention resides, briefly stated, in an arrangement for use in aiming a hand-held scanning head in a laser system for reading symbols at which the head is aimed. Several components are conventionally mounted in the head. For example, means, e.g. a semiconductor laser diode or possibly a gas laser or a non-laser source, are provided within the head for generating an incident light beam, preferably a laser beam. Optic means, e.g. a positive lens, a negative lens, reflecting mirrors, or other optical elements, are also provided within the head for optically modifying, i.e. forming, and directing the incident laser beam along a first optical path toward a reference plane located exteriorly of the head and lying in a plane generally perpendicular to the direction of propagation of the incident laser beam, and to a symbol located in a working distance range in the vicinity of the reference plane. For convenience, a symbol that is located between the reference plane and the head is defined hereinafter as a "close-in" symbol, whereas, a symbol that is located on the other side of the reference plane away from the head is defined as a "far-out" symbol.

Laser light is reflected off the symbol, and at least a returning portion of said reflected laser light travels along a second optical path away from the symbol back toward the head. Scanning means, e.g. a scanning motor having a reciprocally-oscillatable output shaft on which a reflecting surface such as a scanning mirror is mounted, are mounted in the head for scanning the symbol in a scan, and preferably at a plurality of sweeps per second, across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The head also comprises sensor means, e.g. one or more photodiodes, for detecting the variable light intensity of the returning portion of the reflected laser light over a field of view, and for generating an electrical analog signal indicative of the detected variable light intensity. Signal processing means are also mounted in the head for processing the analog electrical signal, and usually for processing the analog signal to a digitized electrical signal, which can be decoded to data descriptive of the symbol being scanned. The scanning means is operative for scanning either the incident laser beam itself across the symbol, or the field of view of the sensor means, or both.

Sometimes, but not always, decode/control electronic circuitry is provided locally in, or remotely from, the head. The decode/control electronic circuitry is operative for decoding the digitized signal to the aforementioned data, for determining a successful decoding of the symbol, and for terminating the reading of the symbol upon the determination of the successful decoding thereof. The reading is initiated by actuation of a manually-actuatable trigger means provided on the head, and operatively connected to, and operative for actuating, the laser beam generating means, scanning means, sensor means, signal processing means, and decode/control means. The trigger means is actuated once for each symbol, each symbol in its respective turn. In a preferred embodiment, the actuation of the trigger means causes the actuation of the decode/control means which, in turn, causes the actuation of the laser beam generating means, scanning means, sensor means and signal processing means.

In conventional usage, the head, which is supported by a user in his or her hand, is aimed at each symbol to be read, and once the symbol is located, the user actuates the trigger means to initiate the reading. The decode/control means automatically alerts the user when the symbol has been read so that the user can turn his or her attention to the next symbol, and repeat the reading procedure.

As noted above, a problem arose when the incident laser beam or the reflected laser light were not readily visible, which can occur due to one or more of such factors as the wavelength of the laser light, the laser light intensity, the ambient light intensity, the scanning rate, as well as other factors. Due to such "invisibility", the user could not see the laser beam and did not know readily when the invisible laser beam was positioned on the symbol, or whether the scanning laser beam was scanning over the entire length of the symbol. To solve that problem, the prior art suggested the use of discrete aiming light arrangements.

However, in accordance with this invention, rather than using discrete aiming light arrangements with their concomitant added weight, greater size and increased energy consumption, this invention proposes using the light source itself to assist the user in locating, and aiming the head at, each symbol prior to reading the symbol with light from the very same light source. The light source, preferably a laser diode, is operatively connected to the scanning means and the trigger means, and operative, when actuated by the trigger means, for directing the light beam from the light source toward the reference plane and to each symbol in turn, visibly illuminating at least a part of, or first zone on, the respective symbol and thereby locating the latter for the user. Thus, the user is assisted in correctly aiming the head at the respective symbol to be read.

In one advantageous embodiment, the arrangement directs the light beam to each symbol to illuminate thereon a generally circular spot region within the field of view, and preferably near the center of the symbol. It is further advantageous if this spot region remains stationary or static during the aiming of the symbol so that both close-in and far-out symbols can be seen and located by the user prior to the scan.

In another advantageous embodiment, the arrangement directs the light beam to a reciprocally oscillating scan mirror operative to sweep the light beam across a part of each symbol. In this case, the first zone is a line region whose length is less than the length of the symbol. Such dynamic aiming is advantageous because close-in symbols can be more readily seen, located and tracked, as compared to static aiming.

In still another advantageous embodiment, the first zone is a line region whose length is at least equal to, and is preferably greater than, the length of the symbol. Such dynamic aiming is best for tracking. Also, the very same light beam can be used for reading since the scan is over the entire symbol.

Preferably, the arrangement directs the light beam to a scan mirror which has a stationary state and at least one reciprocally oscillating state. Initially, the light beam is reflected off the stationary or the moving mirror to each symbol to illuminate thereon a spot or linear region within the field of view, preferably near the center of the symbol, prior to the scan of the symbol to locate the same. Thereupon, the scan mirror is caused to reciprocally oscillate in another reciprocally oscillating state to reflect the light beam to the symbol to sweep the light beam across the entire symbol to illuminate thereon a line region extending along the entire symbol, thereby reading the symbol.

To implement such aiming/reading, it is advantageous if the trigger means has multiple positions and is operatively connected, either directly or indirectly via the decode/control means, to the light source, as well as the oscillatable scan mirror. In a first position, or off state, for the trigger means, all of the components in the head are preferably deactivated. In a second position, or first operational state, the light beam impinges on the scan mirror that is positioned in a predetermined stationary position, e.g. in a center position, for a predetermined time, so that the light beam can be directed to exit the head and illuminate a center spot region of the symbol to be read. In a third position, or second operational state, all of the other components in the head, including those responsible for reciprocally oscillating the scan mirror, are activated, thereby initiating the reading of the symbol and the illumination of a line region along the symbol.

In another embodiment, the scan mirror is reciprocally oscillated in the first operational state over arcs of limited angular distance, e.g. 1°-5°, to illuminate a line region of limited length on the symbol. Thereupon, in the second operational state, the scan mirror is reciprocally oscillated over extended arcs of greater angular distance, e.g. 20°-40°, to illuminate a line region of greater length extending across the entire symbol.

In still another approach, the scan mirror is reciprocally oscillated in both operational states over the extended arcs, in which event, either operational state can be simultaneously used for both aiming and reading. This is especially advantageous for reading close-in and far-out symbols with the same head, or for reading high-density and low-density symbols with the same head.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
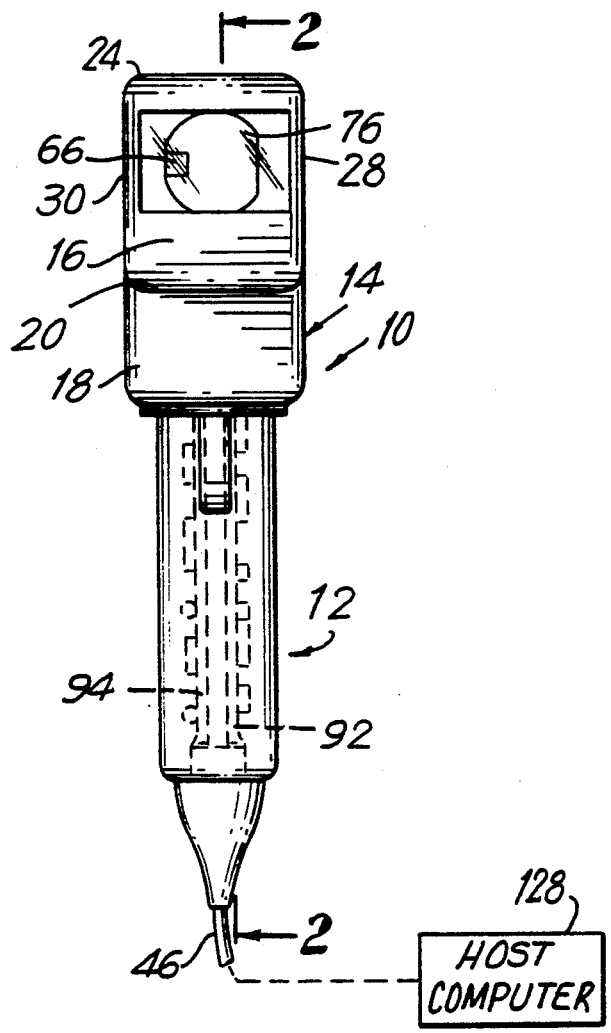
FIG. 1 is a front view of a portable scanning head in accordance with this invention.

Referring now to FIGS. 1-6 of the drawings, reference numeral 10 generally identifies a lightweight (less than one pound), narrow-bodied, streamlined, narrow-snouted, hand-held, fully-portable, easy-to-manipulate, non-arm-and-wrist-fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the aforementioned black and white industrial symbols, e.g. Code 39, Codabar, Interleaved 2 of 5, etc., and also the omnipresent UPC bar code symbol. The indicia may also be any alphabetic and/or numeric characters. The term "symbol" is also intended to cover indicia located in a background field, wherein the indicia, or at least a portion thereof, have a different light-reflective property than that for the background field. In this latter definition, the "reading" of the symbol is of particular benefit in the fields of robotics and object recognition.

Figure 3:
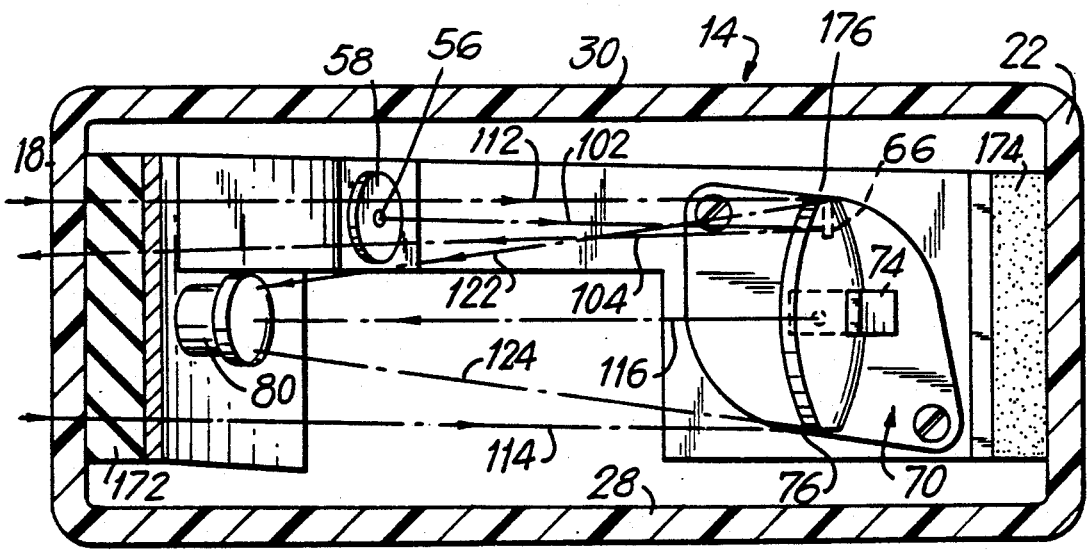
FIG. 3 is a sectional view taken on line 3—3 of FIG. 2.
Figure 2:
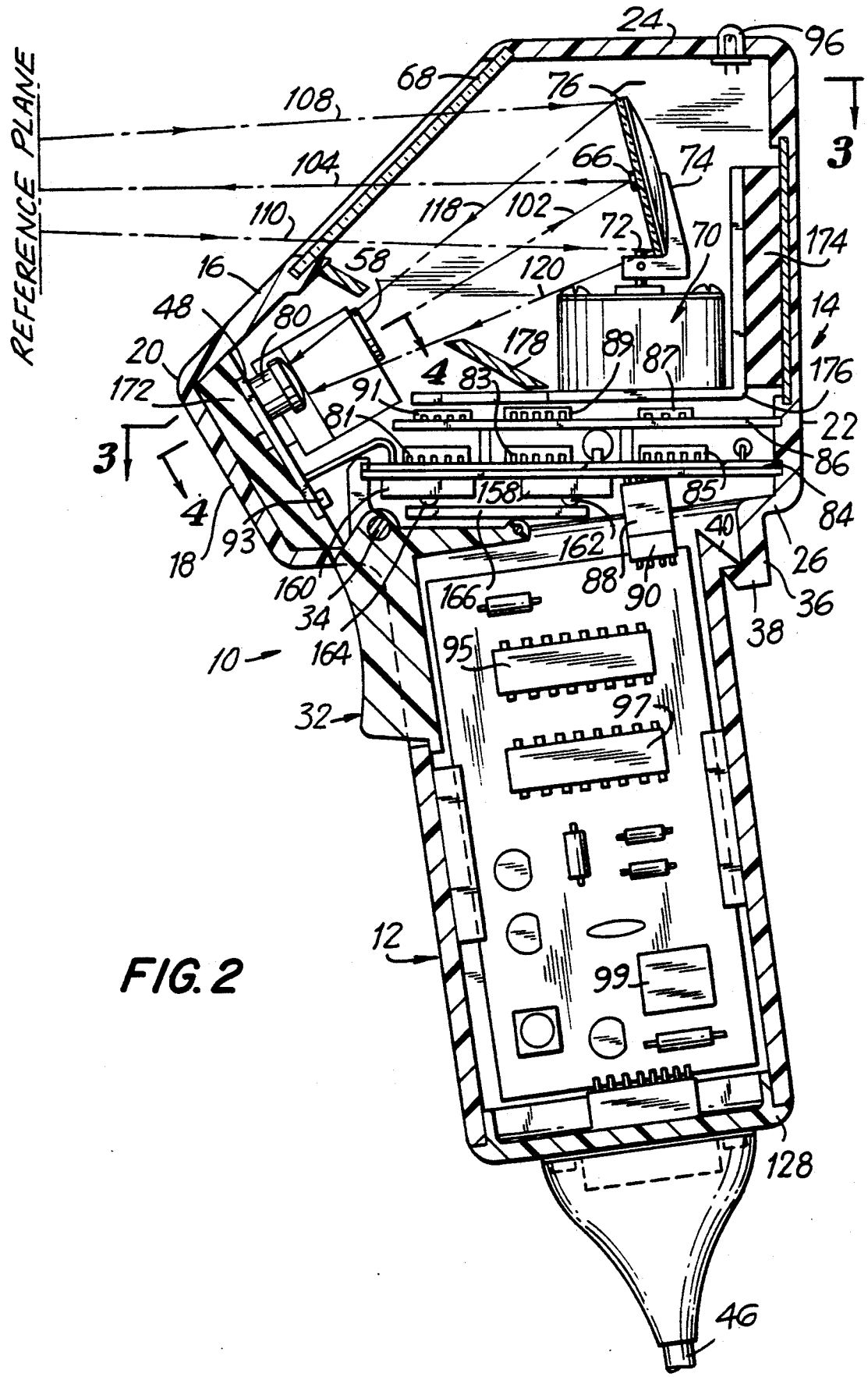
FIG. 2 is an enlarged cross-sectional view taken on line 2—2 of FIG. 1.

Turning now to FIGS. 1-3, the head 10 includes a generally gun-shaped housing having a handle portion 12 of generally rectangular cross-section and generally vertically elongated along a handle axis, and a generally horizontally elongated, narrow-bodied barrel or body portion 14. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell —which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10.

As considered in an intended position of use as shown in FIGS. 1-3, the body portion 14 has a front prow region having an upper front wall 16 and a lower front wall 18 which forwardly converge toward each other and meet at a nose portion 20 which lies at the foremost part of the head. The body portion 14 also has a rear region having a rear wall 22 spaced rearwardly of the front walls 16, 18. The body portion 14 also has a top wall 24, a bottom wall 26 below the top wall 24, and a pair of opposed side walls 28, 30 that lie in mutual parallelism between the top and bottom walls.

A manually-actuatable, and preferably depressible, trigger 32 is mounted for pivoting movement about a pivot axis 34 on the head in a forwardly-facing region where the handle and body portions meet and where the user's forefinger normally lies when the user grips the handle portion in the intended position of use. The bottom wall 26 has a tubular neck portion 36 which extends downwardly along the handle axis, and terminates in a radially-inwardly extending collar portion 38 of generally rectangular cross-section. The neck and collar portions have a forwardly-facing slot through which the trigger 32 projects and is moved.

The handle portion 12 has a radially-outwardly extending upper flange portion 40 of generally rectangular cross-section which also has a forwardly-facing slot through which the trigger 32 projects and is moved. The upper flange portion 40 is resilient and deflectable in a radially-inward direction. When the upper flange portion 40 is inserted into the neck portion 36, the upper flange portion 40 bears against the collar portion 38 and is radially-inwardly deflected until the flange portion 40 clears the collar portion 38, at which time, the upper flange portion 40, due to its inherent resilience, snaps back to its initial undeflected position and engages behind the collar portion with a snap-type locking action. To disengage the handle portion from the body portion, the upper part of the handle portion is sufficiently deflected until the upper flange portion 40 again clears the collar portion, and thereupon the handle portion can be withdrawn from the neck portion 36. In this manner, handle portion 12 can be detachably snap-mounted and de-mounted from the body portion 14 and, if desired, another handle portion from a set of interchangeable handle portions, each containing different components of the laser scanning system, may be mounted to the body portion to adapt the head 10 to different user requirements.

A plurality of components are mounted in the head and, as explained below, at least some of them are actuated by the trigger 32, either directly or indirectly, by means of a control microprocessor. One of the head components is an actuatable light source (see FIG. 4), e.g. a semiconductor laser diode 42, operative, when actuated by the trigger 32, for propagating and generating an incident laser beam whose light, as explained above, is non-readily visible, or is rendered non-readily visible during operation, to the user. The diode may be of the continuous wave or pulse type. The diode 42 requires a low voltage (e.g. 12 v DC or less) supplied by a battery (DC) source which may be provided within the head, or by a rechargeable battery pack accessory detachably mounted on the head, or by a power conductor in a cable 46 (see FIG. 2) connected to the head from an external power supply (e.g. DC source).

Figure 4:
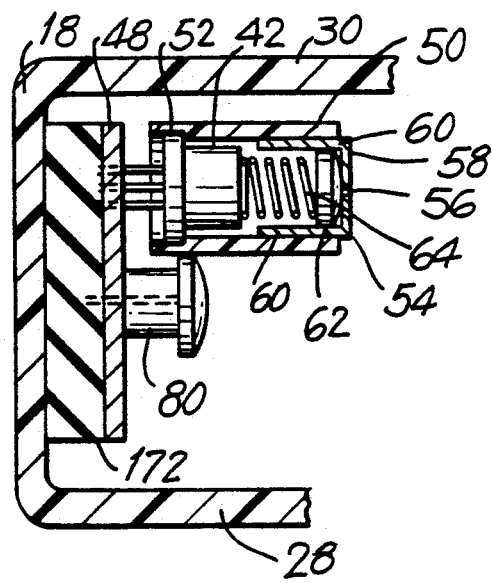
FIG. 4 is an enlarged sectional view taken on line 4—4 of FIG. 2.

As best shown in FIG. 4, the laser diode 42 is mounted on a printed circuit board 48. An optical assembly is mounted in the head and adjustably positioned relative to the diode 42 for optically modifying and directing the incident laser beam along a first optical path toward a reference plane which is located exteriorly of the head, forwardly of the nose portion 20, and which lies generally perpendicular to the longitudinal direction along which the incident laser beam propagates. A symbol to be read is located in the vicinity of the reference plane, either at, or at one side, or at an opposite side, of the reference plane, that is, anywhere within the depth of focus or field of the optically modified incident laser beam, said depth of focus or field also being known as the working distance in which the symbol can be read. The incident laser beam reflects off the symbol in many directions, and that portion of the reflected laser light which travels along a second optical path away from the symbol back toward the head is known herein as the returning portion which, of course, also is non-readily visible to the user.

As best shown in FIG. 4, the optical assembly includes an elongated, cylindrical optical tube 50 having at one end region a cylindrical bore 52 in which an annular casing portion of the diode 42 is snugly received to hold the diode in a fixed position, and at the opposite end region of the optical tube 50 a lens barrel 54 is mounted for longitudinal movement. The lens barrel 54 includes an aperture stop 56, blocking wall portions 58 surrounding and bounding the aperture stop 56, and cylindrical side wall portions 60 which bound an interior space.

The optical assembly further includes a focusing lens 62, e.g. a plano-convex lens, located within the interior space of the side wall portions 60 in the first optical path, and operative for focusing the incident laser beam at the reference plane. The aperture stop 56 may be located on either side of the lens 62, but preferably on the downstream side. A biasing means or tensioned coil spring 64 is located within the optical tube, and has one coil end bearing against a casing portion of the diode, and another coil end bearing against a planar side of the lens 62. The spring 64 constantly urges the lens 62 against the blocking wall portions 58, thereby fixedly locating the lens 62 relative to the aperture stop 56. The lens 62 and aperture stop 56 are jointly moved when the lens barrel 54 is longitudinally moved. The side wall portions 60 are initially received in a threaded or sliding relationship with an inner circumferential wall bounding the optical tube 50, and are thereupon fixed, e.g. by glueing or clamping, to the inner circumferential wall when a desired longitudinal spacing between the lens 62 and the aperture stop 56, on the one hand, and the diode 42, on the other hand, has been obtained. The longitudinal movement between the side wall portions 60 and the inner circumferential wall of the tube 50 constitutes an adjustable positioning means for the lens 62 and the aperture stop 56, and the fixing in position of the lens and the aperture stop relative to the diode constitutes a means for fixedly locating the lens and the aperture stop at a predetermined spacing from the diode.

The aperture stop 56 has a cross-section which is smaller than the cross-section of the incident laser beam at the aperture stop 56, thereby permitting only a portion of the incident laser beam to pass through the aperture stop 56 downstream along the first optical path en route to the symbol. The blocking wall portions 58 obstruct the remaining portion of the incident laser beam, and prevent the remaining portion from passing through the aperture stop 56. The aperture stop cross-section preferably is circular for ease of manufacture, but also may be rectangular or oval, in which case, the longer dimension of the rectangular or oval cross-section is aligned with the larger divergence angle of the incident laser beam to transmit more energy to the symbol.

In accordance with diffraction optics law, the size of the desired incident beam cross-section at the reference plane is determined, inter alia, by the size of the aperture stop, the wavelength of the incident beam, and the longitudinal distance between the lens 62 and the reference plane. Thus, assuming said wavelength and longitudinal distance remain the same, the beam cross-section at the reference plane can be easily controlled by controlling the size of the aperture stop cross-section. The placement of the aperture stop downstream, rather than upstream, of the len 62 avoids also taking the tolerances of the lens into consideration upon determination of the beam cross-section at the reference plane.

The aperture stop 56 is positioned in the center of the laser diode beam so that the intensity of light is approximately uniform in the planes both perpendicular and parallel to the p-n junction, i.e. the emitter, of the diode 42. It will be noted that, due to the non-radial symmetry of the laser diode beam, the light intensity in the plane perpendicular to the p-n junction is brightest in the center of the beam and then falls off in the radially outward direction. The same is true in the plane parallel to the p-n junction, but the intensity falls off at a different rate. Hence, by positioning a preferably circular, small aperture in the center of a laser diode beam having an oval, larger cross-section, the oval beam cross-section at the aperture will be modified to one that is generally circular, and the light intensity in both of the planes- perpendicular and parallel to the p-n junction approximately is constant. The aperture stop preferably reduces the numerical aperture of the optical assembly to below 0.05, and permits the single lens 62 to focus the laser beam at the reference plane.

In a preferred embodiment, the approximate distance between the emitter of the laser diode 42 and the aperture stop 56 ranges from about 9.7 mm to about 9.9 mm. The focal distance of the lens 62 ranges from about 9.5 mm to about 9.7 mm. If the aperture stop 56 is circular, then its diameter is about 1.2 mm. If the aperture stop 56 is rectangular, then its dimensions are about 1 mm by about 2 mm. The beam cross-section is about 3.0 mm by about 9.3 mm just before the beam passes through the aperture stop 56. These merely exemplificative distances and sizes enable the optical assembly to modify the laser diode beam and focus the same to have a beam cross-section of about 6 mils to about 12 mils at a reference plane which is about 3 inches to about 4 inches from the nose portion 20. The working distance is such that a close-in symbol, as previously defined, can be located anywhere from about 1 inch away from the nose portion 20 to the reference plane, and a far-out symbol, as previously defined, can be located anywhere from the reference plane to about 20 inches away from the same.

Figure 7:
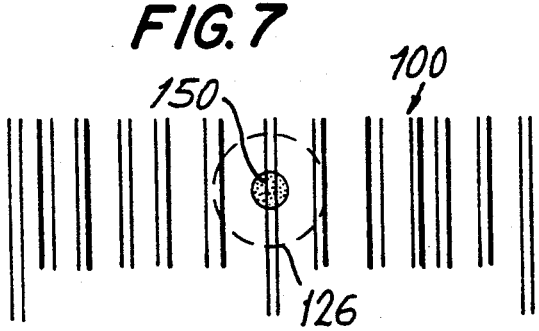
FIG. 7 is an enlarged view of a symbol and the parts thereof which are illuminated during aiming according to one embodiment.

The portion of the incident laser beam that passed through the aperture stop 56 is directed rearwardly by the optical assembly along an optical axis 102 within the head to a generally planar scanning mirror 66 for reflection therefrom. The scanning mirror 66 forwardly reflects the laser beam impinging thereon along another optical axis 104 through a forwardly-facing, laser-light-transmissive window 68 mounted on the upper front wall 68, and to the symbol. As best shown in FIG. 7, a representative symbol 100 in the vicinity of the reference plane is shown and, in the case of a bar code symbol, is comprised of a series of vertical bars spaced apart of one another along a longitudinal direction. The reference numeral 150 denotes the generally circular, visible, laser spot subtended by the symbol. The laser spot 150 in FIG. 7 is shown in a static position, or in an instantaneous dynamic position, since the scanning mirror 66, when actuated by the trigger 32, is, as explained below, maintained stationary or reciprocally and repetitively oscillated transversely to sweep the incident laser beam lengthwise across some or all the bars of the symbol.

The scanning mirror 66 is mounted on a scanning means, preferably a high-speed scanner motor 70 of the type shown and described in U.S. Pat. No. 4,387,397, the entire contents of said patent being incorporated herein by reference and made part of the instant application. For the purposes of this application, it is believed to be sufficient to point out that the scanner motor 70 has an output shaft 72 on which a support bracket 74 is fixedly mounted. The scanning mirror 66 is fixedly mounted on the bracket 74. The motor 70 is driven to reciprocally and repetitively oscillate the shaft 72 in alternate circumferential directions over arc lengths of any desired size, typically less than 360°, and at a rate of speed on the order of a plurality of oscillations per second. In a preferred embodiment, the scanning mirror 66 and the shaft 72 jointly are oscillated so that the scanning mirror 66 repetitively sweeps the incident laser diode beam impinging thereon through an angular distance or arc length at the reference plane of about 1°-5° in a first operational state of the trigger, and about 20°-40° in a second operational state of the trigger, and at a rate of about 20 scans or 40 oscillations per second.

Referring again to FIG. 2, the returning portion of the reflected laser light has a variable light intensity, due to the different light-reflective properties of the various parts that comprise the symbol 100, over the symbol during the scan. The returning portion of the reflected laser light is collected by a generally concave, spherical collecting mirror 76, and is a broad conical stream of light in a conical collecting volume bounded, as shown in FIG. 2, by upper and lower boundary lines 108, 110, and, as shown in FIG. 3, by opposed side boundary lines 112, 114. The collecting mirror 76 reflects the collected conical light into the head along an optical axis 116 (see FIG. 3) along the second optical path to a sensor means, e.g. a photosensor 80. The collected conical laser light directed to the photosensor 80 is bounded by upper and lower boundary lines 118, 120 (see FIG. 2) and by opposed side boundary lines 122, 124 (see FIG. 3). The photosensor 80, preferably a photodiode, detects the variable intensity of the collected laser light over a field of view which extends along, and preferably beyond, the linear scan, and generates an electrical analog signal indicative of the detected variable light intensity.

Referring again to FIG. 7, the reference numeral 126 denotes an instantaneous collection zone subtended by the symbol 100 and from which the instantaneous laser spot 150 reflects. Put another way, the photosensor 80 "sees" the collection zone 126 when the laser spot 106 impinges the symbol. The collecting mirror 76 is mounted on the support bracket 74 and, when the scanner motor 70 is actuated by the trigger 32, the collecting mirror 76 is reciprocally and repetitively oscillated transversely, sweeping the field of view of the photodiode lengthwise across the symbol in a linear scan.

Also mounted in the head is a pair or more of printed circuit boards 84, 86 on which various electrical subcircuits are mounted. For example, signal processing means having components 81, 82, 83 on board 84 are operative for processing the analog electrical signal generated by the sensor 80, and for generating a digitized video signal. Data descriptive of the symbol can be derived from the video signal. Suitable signal processing means for this purpose was described in U.S. Pat. No. 4,251,798. Components 87, 89 on board 86 constitute drive circuitry for the scanner motor 70, and suitable motor drive circuitry for this purpose was described in U.S. Pat. No. 4,387,297. Component 91 on board 86 constitutes a control switch whose operation is described below. Component 93 on board 48, on which the diode 42 and sensor 80 are mounted, is a voltage converter for converting the incoming voltage to one suitable for energizing the laser diode 42. The entire contents of U.S. Pat. Nos. 4,251,798 and 4,387,297 are incorporated herein by reference and made part of the instant application.

The digitized video signal is conducted to an electrical interlock composed of a socket 88 provided on the body portion 14, and a mating plug 90 provided on the handle portion 12. The plug 90 automatically electromechanically mates with the socket 88 when the handle portion is mounted to the body portion. Also mounted within the handle portion are a pair of circuit boards 92, 94 (see FIG. 1) on which various components are mounted. For example, a decode/control means comprised of components 95, 97 and others are operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful reading thereof. The initiation of the reading is caused by depression of the trigger 32. The decode/control means also includes control circuitry for controlling the actuation of the actuatable components in the head, as initiated by the trigger, as well as for communicating with the user that the reading has been automatically terminated as, for example, by sending a control signal to an indicator lamp 96 to illuminate the same.

The decoded signal is conducted, in one embodiment, along a signal conductor in the cable 46 to a remote host computer 128 which serves essentially as a large data base, stores the decoded signal and, in some cases, provides information related to the decoded signal. For example, the host computer can provide retail price information corresponding to the objects identified by their decoded symbols.

In another embodiment, a local data storage means, e.g. component 95, is mounted in the handle portion, and stores multiple decoded signals which have been read. The stored decoded signals thereupon can be unloaded to a remote host computer. By providing the local data storage means, the use of the cable 46 during the reading of the symbols can be eliminated—a feature which is very desirable in making the head as freely manipulatable as possible.

As for electrically powering the laser diode 42, as well as the various components in the head requiring electrical power, a voltage signal may be conveyed along a power conductor in the cable 46, and a converter, such as component 93, may be employed to convert the incoming voltage signal to whatever voltage values are required.

In accordance with this invention, rather than employing a discrete aiming light arrangement, the laser diode 42 itself is used for aiming purposes. As shown in FIG. 2, the trigger 32 is shown in an off state, wherein at least some, if not all, of the actuatable components in the head are deactivated. A pair of electrical switches 158, 160 (see FIG. 5) are mounted on the underside of board 84. Each switch 158, 160 has a spring-biased armature or button 162, 164 which, in the off state, extend out of the switches and bear against opposite end regions of a lever 166 which is pivoted at a center-offset position at pivot point 168 on a rear extension 170 of the trigger 32.

Figure 5:
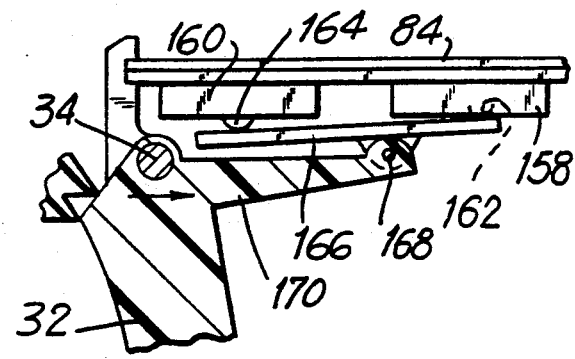
FIG. 5 is an enlarged detail view showing the trigger assembly in a first operational state.

When the trigger 32 is initially depressed to a first initial extent, as shown in FIG. 5, the lever 166 depresses only the button 162, and the depressed switch 158 establishes a first operational state in which the trigger 32 actuates the diode 42 whose light beam is directed rearwardly to the scanning mirror 66 for forward reflection therefrom. Alternatively, the diode 42 may already be on, and the trigger is operative to cause the light beam to travel to the scanning mirror. In said first operational state, the trigger has positioned the scanning mirror 66 in a predetermined stationary position. The stationary scanning mirror 66 directs the light beam to the symbol, visibly illuminating thereon a spot region 150 within the field of view prior to the scan to assist the user in locating the symbol before the reading thereof. The stationary positioning of the scanning mirror 66 is advantageously accomplished by energizing a DC winding of the scanner motor 70 so that the output shaft and the scanning mirror 66 mounted thereon are angularly turned to a central reference position. A DC voltage is switched to the motor winding by control switch 91. When the scanning motor is stationary, power to the laser diode can be decreased to conserve energy usage.

Figure 8:
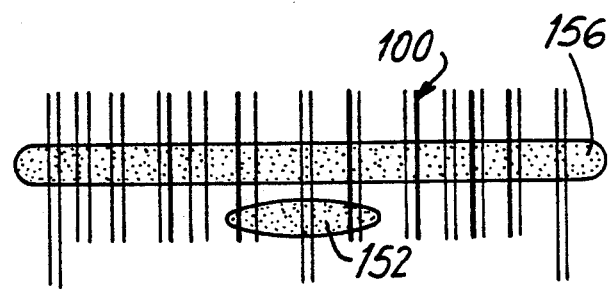
FIG. 8 is an enlarged view of a symbol and the parts thereof which are illuminated during aiming according to other embodiments.

Rather than maintaining the scanning mirror stationary, the trigger could actuate the diode 42 and/or the control circuitry 87, 89 for the scanner motor 70 to oscillate the scanning mirror 66 over limited arcs, e.g. on the order of 1°–5°, visibly illuminating a limited linear region 152 (see FIG. 8) on the symbol. This linear region is less than the length of the symbol. To achieve the limited movement, the winding of the scanner motor is electrically connected by control switch 91 to an AC drive current of a predetermined magnitude.

Alternatively, the scanning mirror 66 could be oscillated over extended arcs, e.g. on the order of 20°–40°, visibly illuminating an extended linear region 156 (see FIG. 8) on the symbol. This linear region is at least equal to the length of the symbol. To achieve the limited movement, the winding of the scanner motor is electrically connected by control switch 91 to an AC drive current of a magnitude greater than said predetermined magnitude.

Figure 6:
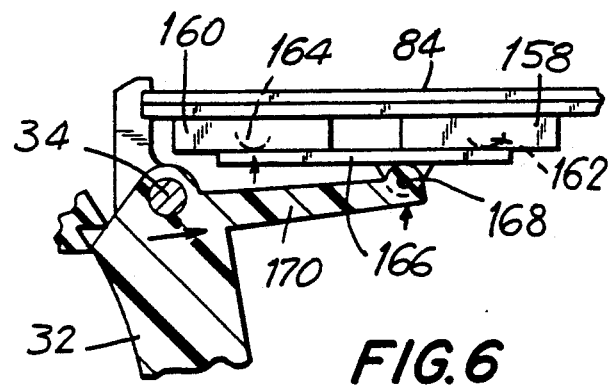
FIG. 6 is a view analogous to FIG. 5, but in a second operational state.

Thereupon, when the trigger 32 is depressed to a second further extent, as shown in FIG. 6, the lever 166 depresses not only the button 162, but also the button 164, so that a second operational state is established. In said second operational state, the trigger actuates all the remaining actuatable components in the head, e.g. the laser diode 42, the control circuitry of the scanner motor 70 which causes the scanning mirror 66 to oscillate, the photodiode 80, the signal processing circuitry, as well as the other circuitry in the head, to initiate a reading of the symbol. The scanning mirror 66 is being oscillated so that the light beam dynamically is swept across the entire symbol, visibly illuminating thereon a line region, identical to the line region 156 extending along the field of view. Hence, during the scan, the user is assisted in tracking the symbol during the reading thereof. Such symbol tracking is highly visible for close-in symbols, but less so for far-out symbols.

In the case where the first zone and the second zone are visible linear scans, each extending across the entire symbol, the same head can be used for reading different density or differently positioned symbols relative to the head.

The aforementioned sequential acuation of the components in the head could also be done with a single two-pole switch having built-in sequential contacts.

Returning to FIG. 1, it will be noted that many of the various components in the head are shock-mounted by a front shock isolator 172 on which the board 48 and all the components thereon are supported, and by a rear shock isolator 174 on which a support plate 176 on which the scanner motor 70 is supported. A light baffle 178 subdivides the interior of the body portion and prevents stray ambient light from reaching the photosensor 80.

The laser scanning head of FIG. 2 is of the retroreflective type wherein the outgoing incident laser beam, as well as the field of view of the sensor means, are scanned. It will be readily understood that other variants are also within the spirit of this invention, for example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

A variety of housing styles and shapes dictated by such considerations as esthetics, environment, size, choise and placement of electronic and mechanical components, required shock resistant both inside and outside the housing, may be employed in place of the housing shown in the drawings.

The laser scanning head of this invention need not be hand-held, but can also be incorporated in a desk-top, stand-alone workstation in which the symbol is passed through the workstation, preferably underneath an overhead window or port through which the outgoing incident laser beam is directed. Although the workstation itself is stationary, at least during the scanning of the symbol, the symbol is movable relative to the workstation and must be registered with the outgoing beam.

It should be noted that the laser scanning head of this invention can read high-, medium- and low-density bar code symbols within approximate working distance ranges og 1" to 6", 1" to 12", and 1" to 20", respectively. As defined herein, the high-, medium- and low-density bar code symbols have bars and/or spaces whose smallest width is on the order of 7.5 mils, 15–20 mils and 30–40 mils, respectively. In the preferred embodiment, the position of the reference plane for a symbol of a known density is optimized for the maximum working distance for that symbol.

In another aspect of this invention, it is sometimes desirable to cause the aforementioned aiming light spot or linear regions on the symbol to blink, e.g. for the purpose of making the illuminated zones easier to see, or to reduce the average power consumed by the laser diode. Such blinking zones can be effected by electrical and/or mechanical means.

It will be understood that each of the elements described above, or two or more together, also may find a useful application in other types of constructions differing from the types described above.

While the invention has been illustrated and described as embodied in a multi-position trigger for portable laser diode scanning head, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement in a light-scanning system for reading indicia having parts of different light reflectivity, comprising:
    (a) a housing having an exit port;
    (b) light source means in the housing for generating a light beam;
    (c) actuatable control means in the housing for directing the light beam through the exit port to illuminate a first zone on the indicia in a first operational state, and for directing the same light beam to illuminate a second zone on the indicia in a second operational state; and
    (d) actuator means for manually actuating the control means between said states, including a multi-position trigger manually displaceable from an off position to a first position corresponding to the first operational state, and being further manually displaceable from the first position to a second position corresponding to the second operational state.

2. The arrangement according to claim 1, wherein the housing has a handle for hand-held operation, and wherein the actuator means is on the housing.

3. The arrangement according to claim 1, wherein the first zone is a static aiming spot region, and wherein the second zone is a dynamic reading linear region extending entirely across the indicia.

4. The arrangement according to claim 1, wherein the first zone is a dynamic aiming linear region extending partly across the indicia, and wherein the second zone is a dynamic reading linear region extending entirely across the indicia.

5. The arrangement according to claim 1, wherein both zones are dynamic reading linear regions located at different distances from the exit port of the housing.

6. The arrangement according to claim 1, wherein the light source means is a laser operative for generating a laser beam, and wherein the control means directs the laser beam to illuminate both the first and second zones on the indicia in the respective operational states.

7. The arrangement according to claim 1, wherein the control means includes scanning means having a movable scan element operative for sweeping the light beam across the indicia in one of the operational states.

8. The arrangement according to claim 7, wherein the scan element is a reflecting mirror mounted for repetitive reciprocating movement in alternate circumferential directions relative to an axis along arcs.

9. The arrangement according to claim 8, wherein the actuator means maintains the scan element stationary in the first operational state, and repetitively reciprocatingly moves the scan element along arcs of predetermined angular distance in the second operational state.

10. The arrangement according to claim 8, wherein the actuator means repetitively reciprocatingly moves the scan element along arcs of limited angular distance in the first operational state, and repetitively reciprocatingly moves the scan element along arcs of predetermined angular distance greater than said limited angular distance in the second operational state.

11. The arrangement according to claim 8, wherein the actuator means repetitively reciprocatingly moves the scan element along arcs of predetermined angular distance in both said operational states.

12. A system for reading bar code symbols or the like, comprising;
scanning means for generating a laser beam directed toward a symbol to be read;
control means including a multi-position trigger operatively connected to the scanning means and manually displaceable from an off position to a first selectable position for producing a first beam pattern that enables a user to manually aim and direct the beam to the symbol at a location desired by the user and being further manually displaceable from the first position to a second selectable position for producing a second beam pattern that entirely sweeps the symbol to be read; and
detection means for receiving reflected light from the symbol to produce electrical signals corresponding to data represented by the symbol.

13. The system according to claim 12, further comprising a housing having a handle for hand-held operation, and wherein the scanning means and the detection means are disposed in the housing, and wherein the trigger is mounted on the housing.

14. The system according to claim 12, wherein the scanning means includes a movable scan element operative for sweeping the laser beam across the symbol in one of the first and second positions, and wherein the control means repetitively reciprocatingly moves the scan element along arcs of limited angular distance in the first position, and repetitively reciprocatingly moves the scan element along arcs of predetermined angular distance greater than said limited angular distance in the second position.

15. A method of reading bar code symbols or the like, comprising the steps of:
directing a laser beam toward a symbol to be read;
manually displacing a multi-position trigger from an off state to a first operational state in which a first beam pattern with said laser beam is produced to enable a user to manually aim and direct the beam to the symbol at a location desired by the user;
manually displacing the trigger from the first operational state to a second operational state in which a second beam pattern that entirely sweeps the symbol is produced; and
receiving reflected light from the symbol to produce electrical signals corresponding to data represented by the symbol.

16. The method according to claim 15, further comprising the steps of mounting means for generating said laser beam in a housing, said housing including a handle for hand-held operation, and mounting scanning means for directing the laser beam and detection means for receiving the reflected light in the housing; and mounting the trigger on the housing.

17. The method according to claim 15, wherein the step of providing a laser beam further includes the step of mounting a movable scan element in a housing, the scan element being operative for sweeping the laser beam across the symbol, and repetitively reciprocatingly moving the scan element along arcs of limited angular distance in the first operational state, and repetitively reciprocatingly moving the scan element along arcs of predetermined angular distance greater than said limited angular distance in the second operational state.

* * * * *